Patented Oct. 22, 1935

2,018,557

UNITED STATES PATENT OFFICE 2,018,557

RESINOUS COATING COMPOSITION

Horace H. Hopkins, Ridley Park, Pa., assignor to E. I. du Pont de Nemours & Company, Wilmington, Del., a corporation of Delaware No Drawing. Application January 7, 1932, Serial No. 585,396

3 Claims. (Cl. 134—26)

This invention relates to coating compositions comprising solutions of synthetic resins in organic solvents, and more particularly to new solvents for such compositions made from resins of the polyhydric alcohol-polybasic acid and phenol-formaldehyde type.

In the manufacture of coating compositions from synthetic resins, the solvents used for many of the most important resins have been restricted for the most part to the more expensive coal tar solvents because of their poor solubility in the ordinary types of aliphatic hydrocarbons, such as turpentine substitute (a hydrocarbon in the nature of gasoline) derived from petroleum. The coal tar solvents usually used are Hi-flash naphtha or toluol. Mixtures of the aromatic solvents with the ordinary aliphatic solvents are frequently used. Other powerful solvents, such as esters, alcohols, terpenes and ketones may also be used either by themselves or diluted with gasoline type hydrocarbons.

The use of any of the strong oxygenated or aromatic solvents such as mentioned above is attended with numerous disadvantages. They are too expensive to make possible the wide use of coating compositions containing them. Such solvents have a tendency to soften the undercoats over which they are applied, and in some cases, cause them to wrinkle or lift. They also have strong odors which are frequently objectionable. The available supply of coal tar solvents is also definitely limited.

In the case of those few resins which are soluble in aliphatic hydrocarbons alone, large quantities of such solvents are required in order to reduce the viscosity of the material to the point where it can be brushed or applied in any of the common ways.

This invention has as an object the manufacture of improved coating compositions comprising synthetic resin and organic solvent. Other objects will appear hereinafter.

I have discovered that there are certain solvents obtainable from petroleum which possess marked advantages over the solvents previously used in the manufacture of coating compositions from polyhydric alcohol-polybasic acid resins and phenol formaldehyde resins.

The resins referred to herein are those resins which are soluble in Hi-flash naphtha and which are known to those skilled in the art to be valuable for making coating compositions. The present invention is based on the discovery that these resins, and particularly polyhydric alcohol-polybasic acid resins, may be dissolved in the petroleum solvent hereinafter disclosed and identified for the production of valuable coating compositions.

The petroleum solvents that I have found to be valuable solvents for the resins mentioned boil within the range of 60° C. to 260° C. and may be distilled from petroleum from certain sources and may be obtained from a wider range of petroleums when refined by certain processes. Since all petroleum distillates of this boiling range do not have the solvent power of my new solvents, I will first point out the sources from which the improved solvents may be obtained and then show how they may be identified and distinguished from the petroleum solvents of poorer solvent power previously used for synthetic resins of the type disclosed herein.

By testing the petroleum hydrocarbons obtained from various producing fields and refined in various manners, I have discovered that petroleum hydrocarbon solvents of varying degrees of solvency for the resins of the type mentioned can be secured. The petroleum solvents obtained by normal distillation of Pennsylvania crude and mid-continent crude possess very little solvency. These oils are satisfactory, however, when refined by cracking processes. Those obtained by normal or straight run distillation from Gulf Coast crude and California crude have somewhat better solvency and can be used in some cases without being cracked. Investigation of various methods of refining the same crude have shown that either pressure still cracking or vapor phase cracking will produce solvents of much greater solvency than those obtained by normal distillation and I have found that in most cases cracked oils will give satisfactory solvents. The solvents having the degree of solvency required for the purposes of the present invention may be identified by either of the two tests known as the aniline miscibility test and the dilution test. The aniline miscibility test which is the best and most satisfactory method of selecting my new solvents is based upon the fact that the critical solution temperature of two liquids is the maximum temperature at which any solution clouds. In other words, it is the maximum temperature at which two liquid phases can exist with any possible ratio of the two components. This test depends upon the measurement of the critical solution temperature of a liquid system having aniline as one component, and the solvent to be tested as the other. This test is an index of the solubility of the resin in the solvent, high solubility corresponding to a low critical solution temperature, and low solubility corresponding to a high critical solution temperature. This test is carried out as follows:

Place in a 6" test tube, 3 cc. of freshly distilled aniline. From a small burette, add of the material to be tested, ½ cc. less than the volume which is expected to give the critical value. Warm the mixture in a water bath to a few degrees above the point where a clear solution appears. Mix the contents of the tube by shaking, inserting in the test tube a suitable thermometer, shake, and read the temperature to the nearest ½ degree, continue alternate shaking and reading rapidly until the solution clouds, record the temperature, add $\frac{1}{10}$ cc. more of the material to be tested and repeat the procedure. Add another $\frac{1}{10}$ cc. and repeat again. These three trials should give two successive readings the same, or should carry the temperature through a maximum with two of the readings differing by less than ½ degree. The highest temperature obtained is the critical solution temperature. When this temperature is below room temperature, the water bath is replaced by a freezing mixture.

The dilution value as a solubility test depends upon the fact that a solvent in which a certain resin is relatively insoluble will precipitate that resin from solution in another solvent in which it is soluble. This test, when used for the determination of the new is carried out as follows:

A solution of the resin in the solvent to be tested, as for instance 10 cc. of a 35% solution of the resin of Example V below, is placed in a 150 cc. beaker and mineral spirits titrated into the beaker until a cloud develops which cannot be cleared by stirring. The end point is determined by holding a stirring rod on the far side of the beaker and looking through it at a source of light, such as a window. The point at which the outlines of the stirring rod disappear is taken as the end point, and the solvency of the naphtha used to prepare the original resin solution is obtained in terms of the number of cc. of mineral spirits added.

I have found in my investigations of the solvency of the resins in various aliphatic hydrocarbons that those petroleum hydrocarbons boiling within the range of 60° C. to 260° C. which are obtainable from the sources mentioned, and which have an aniline point of from about —5° C. to about 50° C. or a dilution value of from about 15 to about 35, will give, in the manufacture of resinous coating compositions, marked advantages over the solvents usually used.

The following table gives a comparison of my new solvent with petroleum distillate of approximately the same boiling range which is unsuitable for the purposes of the present invention.

| Solvent | Critical temperature °C. | Dilution | Viscosity |
|---|---|---|---|
| Normal run distillate | 62.0 | 9.2 | 434 |
| Cracked mid-continent distillate | 42.5 | 16.6 | 43 |
| Normal California distillate | 19.0 | 24.0 | 36 |

The hydrocarbon designated normal run distillate, obtained from mid-continent crude is of little value as a resin solvent as will be apparent from the high critical temperature value, the low dilution ratio and the extremely high viscosity of the resin solution. The distillates obtained from the cracked mid-continent oil and the normal California crude do, on the other hand, fall within the proper critical temperature and dilution values and are excellent resin solvents giving low viscosity resin solutions.

The viscosity ratings given are obtained by recording the time in seconds necessary for 50 cc. of a 35% solution of a typical resin to flow through a standardized viscosity cup at 25° C.

The solvents disclosed herein are especially valuable for the manufacture of improved coating compositions from resins of the polyhydric alcohol-polybasic acid type, and especially the oil modified resins which are made by reacting with heat treatment a polyhydric alcohol, a polybasic acid (or anhydride) and a fatty oil or a fatty oil acid. The following are examples of coating compositions made from these resins and my new solvent, the composition and method of making the resins appearing hereinafter.

*Example I*

| | |
|---|---|
| Resin A | 77.8 |
| Liquid cobalt drier | 0.9 |
| Straight run California distillate—boiling range 170–200° | 21.3 |
| | 100.0 |

The above ingredients are simply mixed together and any suspended material removed by means of a centrifuge. The resulting solution may be satisfactorily used as a clear varnish for finishing woodwork, furniture, etc. It dries to a tack-free stage in about eight hours.

*Example II*

| | |
|---|---|
| Resin B | 78.6 |
| Liquid cobalt drier | 1.7 |
| Cracked California solvent—boiling range 155–205° | 19.7 |
| | 100.0 |

The above composition is similar to that of Example I and dries to a tack-free stage in about ten hours.

*Example III*

| | |
|---|---|
| Titanium dioxide | 21.03 |
| Resin A | 29.68 |
| Liquid cobalt drier | 0.75 |
| Cracked mid-continent distillate—boiling range 140–180° C | 48.54 |
| | 100.00 |

The foregoing ingredients may be combined in any of the common ways known to the manufactures of enamels, and the resulting coating composition will dry to a tack-free stage in about 3¾ hours.

*Example IV*

| | |
|---|---|
| Titanium dioxide | 19.82 |
| Resin B | 28.21 |
| Liquid cobalt drier | 1.41 |
| Cracked Pennsylvania solvent — boiling range 185–215° C | 50.56 |
| | 100.00 |

The enamels prepared from these ingredients will dry to a tack-free stage in about eight hours.

The composition of the resins referred to in the foregoing examples are indicated below as resins A and B.

Resin A

| | |
|---|---|
| Linseed oil | 18.77 |
| China wood oil | 23.46 |
| Phthalic anhydride | 39.89 |
| Glycerol | 17.88 |
| | 100.00 |

Resin B

| | |
|---|---|
| Linseed oil | 37.16 |
| China wood oil | 32.99 |
| Phthalic anhydride | 13.20 |
| Glycerol | 16.65 |
| | 100.00 |

As a further example of a suitable resin the following may be mentioned:

| | |
|---|---|
| Phthalic anhydride | 28.30 |
| Linseed oil | 59.73 |
| Glycerol | 11.97 |
| | 100.00 |

These resins are prepared from the ingredients mentioned above by heating the oils and glycerol with or without a basic oxide catalyst at about 440° F. until complete miscibility of the two liquids is secured. Phthalic anhydride is then added and heating continued until resinification is complete. The time required may be from about four to about twelve hours depending upon the proportions of ingredients.

I have also found that my new petroleum solvents are of special utility in the manufacture of coating compositions from oil soluble phenol-formaldehyde resins. These resins, as well understood by those skilled in the art, are made by condensing various phenolic bodies with an aldehyde with or without the presence of a fatty oil or its equivalent. The following is an example of an enamel vehicle containing this type of resin:

Example V

| | |
|---|---|
| Oil soluble phenol formaldehyde resin | 710 |
| China wood oil | 1390 |
| Cracked California solvent (boiling range 155-105° C.) | 2168 |
| Cobalt drier | 10 |
| | 4278 |

The oil and resin are heated together for about thirty minutes at 225° C. It is then cooled, and the solvent and drier added.

The foregoing examples are illustrative of a great variety of coating compositions which may be made from these solvents in the manner known to those skilled in the art of their manufacture.

Other ingredients known to be useful in the manufacture of resins similar to the foregoing may, of course, be used. Thus, the polyhydric alcohol-polybasic acid resins may be made from various polyhydric alcohols such as glycol and sorbitol and from various polybasic acids such as maleic and succinic acids or their anhydrides which are known to those skilled in the art to be useful in the manufacture of these resins. In addition to oil, various other solubilizing or modifying agents, such as rosin, natural resins, resin acids, etc., may be used. These oil modified resins may be made with the fatty oil as indicated in the examples or they may be made with the fatty oil acids by fusing all the resin ingredients together in the conventional manner.

Petroleum solvents coming within the specifications given herein and obtained from sources other than those mentioned may likewise be utilized. The foregoing solvents may also be synthesized, i. e., petroleum products modified by chemical treatments such as hydrogenation, and the products used provided that their characteristics come within the specifications I have given, as measured by the critical solution temperature with aniline, and dilution ratio with mineral spirits. Any of the common pigments employed may be used in the manufacture of colored compositions.

The solubility of the oil modified synthetic resins varies directly with the oil content. Polyhydric alcohol-polybasic acid resins containing 40% or more of oil are soluble in any petroleum distillate which has a critical solution temperature with aniline of 40° C. or less, or a dilution ratio of 15 or more, when determined in the manner described above. Resins containing 60% or more of drying oil are soluble in petroleum solvents obtained by normal distillation, but even in the case of these resins the higher solvent power of the special distillates having the physical constants given above, is of great value in reducing viscosity, improving application properties, and making possible coating compositions of higher solids content.

As many apparently widely different embodiments of this invention may be made without departing from the spirit and scope thereof, it is to be understood that I do not limit myself to the specific embodiments thereof except as defined in the following claims:

I claim:

1. A coating composition comprising a solution of a resin in solvent distilled from petroleum refined by a cracking process, said solvent boiling within the range of about 60° C. to 260° C. and having an aniline point of from about −5° C. to about 50° C. and a dilution value of from about 15 to about 35, said resin being selected from the class of synthetic resins consisting of polyhydric alcohol-polybasic acid resins and phenol formaldehyde resins.

2. A coating composition comprising a solution of an oil modified polyhydric alcohol-polybasic acid resin in petroleum solvent boiling within the range of about 60° C. to 260° C. and having an aniline point of from about −5° C. to about 50° C. and a dilution value of from about 15 to about 35, said solvent being obtained by distillation of petroleum refined by a cracking process.

3. The coating composition set forth in claim 2 in which the resin is an oil modified glyceryl phthalate resin.

HORACE H. HOPKINS.